(12) United States Patent
Prieto et al.

(10) Patent No.: US 10,596,655 B2
(45) Date of Patent: Mar. 24, 2020

(54) MAGNETIC PULSE ACTUATION ARRANGEMENT FOR DOWNHOLE TOOLS AND METHOD

(71) Applicants: Carlos Prieto, Katy, TX (US); James Joseph Freeman, Houston, TX (US); Daniel Ewing, Katy, TX (US); John K. Wakefield, Cypress, TX (US); Partha Ganguly, Sugarland, TX (US)

(72) Inventors: Carlos Prieto, Katy, TX (US); James Joseph Freeman, Houston, TX (US); Daniel Ewing, Katy, TX (US); John K. Wakefield, Cypress, TX (US); Partha Ganguly, Sugarland, TX (US)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 117 days.

(21) Appl. No.: 15/674,162

(22) Filed: Aug. 10, 2017

(65) Prior Publication Data
US 2018/0045007 A1    Feb. 15, 2018

Related U.S. Application Data

(60) Provisional application No. 62/374,150, filed on Aug. 12, 2016.

(51) Int. Cl.
*E21B 23/01* (2006.01)
*E21B 31/20* (2006.01)
(Continued)

(52) U.S. Cl.
CPC .............. *B23K 20/06* (2013.01); *B21D 26/14* (2013.01); *E21B 4/12* (2013.01); *E21B 23/00* (2013.01);
(Continued)

(58) Field of Classification Search
CPC . E21B 4/12; E21B 23/00; E21B 23/01; E21B 31/20; E21B 33/12; E21B 33/134;
(Continued)

(56) References Cited

U.S. PATENT DOCUMENTS 3,810,372 A    5/1974  Queyroix
4,619,127 A   10/1986  Sano et al.
(Continued)

FOREIGN PATENT DOCUMENTS

GB      1383605 A  *  2/1974  ............. B21D 26/14
KR   101529700 B1    6/2015
(Continued)

OTHER PUBLICATIONS

Psyk, et al., "Electromagnetic forming—A review"; Journal of Materials Processing Technology 211 (2011) pp. 787-829.
(Continued)

*Primary Examiner* — David J Bagnell
*Assistant Examiner* — Yanick A Akaragwe
(74) *Attorney, Agent, or Firm* — Cantor Colburn LLP (57) ABSTRACT

A method for installing a tool in a downhole system including running the tool to a target location within a tubular structure, creating a magnetic pulse, and urging the tool toward the tubular structure at a minimum velocity of 200 meters per second with the magnetic pulse. A method for actuating a downhole tool including creating a magnetic pulse, coupling the magnetic pulse to a workpiece and moving the workpiece with the pulse, the workpiece achieving a minimum velocity of 200 meters per second.

12 Claims, 6 Drawing Sheets

(51) Int. Cl.
  *E21B 33/12* (2006.01)
  *B23K 20/06* (2006.01)
  *E21B 23/00* (2006.01)
  *E21B 4/12* (2006.01)
  *E21B 33/134* (2006.01)
  *B21D 26/14* (2006.01)
  *E21B 41/00* (2006.01)
  *E21B 43/08* (2006.01)
  *E21B 43/10* (2006.01)
  *E21B 47/00* (2012.01)

(52) U.S. Cl.
  CPC .............. *E21B 23/01* (2013.01); *E21B 31/20* (2013.01); *E21B 33/12* (2013.01); *E21B 33/134* (2013.01); *E21B 41/00* (2013.01); *E21B 43/08* (2013.01); *E21B 43/10* (2013.01); *E21B 47/00* (2013.01)

(58) Field of Classification Search
  CPC .......... E21B 41/00; E21B 43/08; E21B 43/10; E21B 47/00
  See application file for complete search history.

(56) References Cited

U.S. PATENT DOCUMENTS

| | | | |
|---|---|---|---|
| 4,825,954 A * | 5/1989 | Baugh | E21B 23/01 166/208 |
| 5,188,177 A | 2/1993 | Curry | |
| 5,826,320 A | 10/1998 | Rathke et al. | |
| 5,955,934 A | 9/1999 | Raj | |
| 6,474,534 B2 | 11/2002 | Gabbianelli et al. | |
| 7,301,429 B1 | 11/2007 | Hall et al. | |
| 8,662,169 B2 * | 3/2014 | Cortez | E21B 17/02 166/256 |
| 9,476,277 B2 | 10/2016 | Stamatakis | |
| 2004/0079524 A1 | 4/2004 | Bass et al. | |
| 2004/0084381 A1 | 5/2004 | Korenev | |
| 2004/0084442 A1 | 5/2004 | LaRovere | |
| 2005/0097934 A1 | 5/2005 | Park | |
| 2006/0081684 A1 | 4/2006 | Moore | |
| 2006/0131300 A1 | 6/2006 | Yablochnikov | |
| 2008/0061789 A1 | 3/2008 | Coates et al. | |
| 2009/0085701 A1 | 4/2009 | Veneruso et al. | |
| 2012/0169334 A1 | 7/2012 | Hopper et al. | |
| 2014/0238662 A1 | 8/2014 | Prieto | |
| 2014/0239957 A1 | 8/2014 | Zhang et al. | |
| 2015/0159475 A1 | 6/2015 | Prieto et al. | |
| 2015/0308228 A1* | 10/2015 | Vick, Jr. | E21B 43/12 166/373 |
| 2015/0328712 A1 | 11/2015 | Grubb | |
| 2016/0040506 A1 | 2/2016 | Goodman et al. | |
| 2016/0097268 A1 | 4/2016 | Okoniewski et al. | |
| 2016/0175980 A1 | 6/2016 | Golovashchenko et al. | |
| 2017/0266752 A1* | 9/2017 | Apel | H05B 6/36 |
| 2018/0043463 A1 | 2/2018 | Prieto et al. | |
| 2018/0045006 A1 | 2/2018 | Prieto et al. | |
| 2018/0080296 A1 | 3/2018 | Prieto et al. | |
| 2018/0188413 A1 | 7/2018 | Capoglu et al. | |

FOREIGN PATENT DOCUMENTS

| | | |
|---|---|---|
| WO | 0181021 A2 | 11/2001 |
| WO | 2007132468 A1 | 11/2007 |

OTHER PUBLICATIONS

Arumugam, et al.; "Experimental Study of Electromagnetic Sheet Metal Forming Process", 12th Global Congress on Manufacutring & Management, Procedia Engineering 97 ( 2014 ) pp. 277-290; 14 pages total.

Bay, et al.; "Electromagnetic forming processes: material behaviour and computational modelling"; 11th International Conference on Technology, Nagoya, Japan; Procedia Engineering 81 ( 2014 ) 793-800, 8 pages total.

Gayakwad, et al.; "A Review on Electromagnetic Forming Process"; 3rd International Conference on Materials Processing and Characterisation; Procedia Materials Science 6 ( 2014 ) 520-527, 8 pages total.

International Search Report and Written Opinion, dated Nov. 20, 2017, International Appln. No. PCT/US2017/046289, Written Opinion 6 Pages, International Search Report 3 Pages.

Introductory Electromagnetics; Zoya Popović & Branko D. Popović'; Chapter 20—Skin Effects, p. 382-392; Prentice Hall (2000).

Kinsey, et al.; "Electromagnetic forming and Joining of Dissimilar Materials"; I/URC for Metal Deformatin Processes Planning Meeting, Evanston, IL; Mar. 14-15, 2017; 10 pages.

Notification of Transmittal of the International Search Report and the Written Opinion of the International Searching Authority, or the Declaration; PCT/US2017/046296; dated Nov. 2017; 10 pages.

Notification of Transmittal of the International Search Report and the Written Opinion of the International Searching Authority, or the Declaration; PCT/US2017/046298; dated Nov. 22, 2017; 12 pages.

Notification of Transmittal of the International Search Report and the Written Opinion of the International Searching Authority, or the Declaration; PCT/US2017/047507; dated Oct. 31, 2017; 8 pages.

Otin, et al., "A Frequency Domain Approach for Computing the Lorentz Force in Electromagnetic Metal Forming"; International Center for Numerical Methods in Enginnering; 2004-2007; 50 pages.

Otin, et al., "Electromagnetic Metal Forming"; CIMNE—International Center for Numerical Methods in Engineering, Barcelona, Spain; Jul. 2011; 37 pages.

Psyk, et al.; "Process Model and Design for Magnetic Pulse Welding by Tube Expansion"; 5th Internatational Conference on High Speed Forming, 2012; 10 pages.

Senthilnathan, et al.; "A two stage finite element analysis of electromagnetic forming of perforated aluminium sheet metals"; 12th Global Congress on Manufacturing and Management; Procedia Engineering 97 ( 2014 ) 1135-1144; 10 pages total.

Yu, Haiping; "Effects of current frequency on electromagnetic tube compression"; Journal of Materials Processing Technology, Jan. 2009; 8 pages.

* cited by examiner

MAGNETIC PULSE ACTUATION ARRANGEMENT FOR DOWNHOLE TOOLS AND METHOD

CROSS REFERENCE TO RELATED APPLICATIONS

This application claims the benefit of an earlier filing date from U.S. Provisional Application Ser. No. 62/374,150 filed Aug. 12, 2016, the entire disclosure of which is incorporated herein by reference.

BACKGROUND

In the resource recovery industry, resources are often recovered from boreholes in formations containing the targeted resource. A plethora of tools are used in such operations, many of them needing to be actuated remotely. While early actuation configurations comprised mechanical connections only, more recent configurations employ chemical, electrical and mechanical means as well as combinations thereof. The industry has many available configurations and methods but due to evolving conditions and recovery concepts, the industry is always in search of alternate configurations and methods to actuate the various tools that are used.

SUMMARY

A method for installing a tool in a downhole system including running the tool to a target location within a tubular structure, creating a magnetic pulse, and urging the tool toward the tubular structure at a minimum velocity of 200 meters per second with the magnetic pulse.

A method for actuating a downhole tool including creating a magnetic pulse, coupling the magnetic pulse to a workpiece and moving the workpiece with the pulse, the workpiece achieving a minimum velocity of 200 meters per second.

BRIEF DESCRIPTION OF THE DRAWINGS

The following descriptions should not be considered limiting in any way. With reference to the accompanying drawings, like elements are numbered alike.

DETAILED DESCRIPTION

A detailed description of one or more embodiments of the disclosed apparatus and method are presented herein by way of exemplification and not limitation with reference to the Figures.

In connection with the present disclosure, applicant's use of the term "pulse" relates to a magnetic field that is rapidly formed and will accelerate a workpiece to a minimum of 200 meters per second wherein the term "pulse" itself is defined by its ability to cause the workpiece to achieve the minimum velocity stated for an unspecified period of time and by ensuring an excitation pulse frequency range is within +/−150% of the natural frequency of the workpiece to be accelerated. Various actuations described herein are achievable using the pulse as defined for differing lengths of time such as installing a tool in the downhole environment, moving a portion of a tool (moving the workpiece), etc.

Generally applicable to all of the embodiments hereof, the pulse occurs pursuant to the use of an inductor attached to a capacitor bank that itself may be attached to a power source for recharging. Release of a high amplitude and high frequency current as the pulse defined above from the capacitor bank at a selected time generates a high-density magnetic field pulse that is coupled to a workpiece placed in the vicinity thereof. An eddy current will consequently be produced in the workpiece with a field orientation that opposes the current induced field hence providing a magnetic pressure that is capable of accelerating the workpiece in a direction. Duration of a given pulse equates to distance of movement for a given system.

Figure 1:
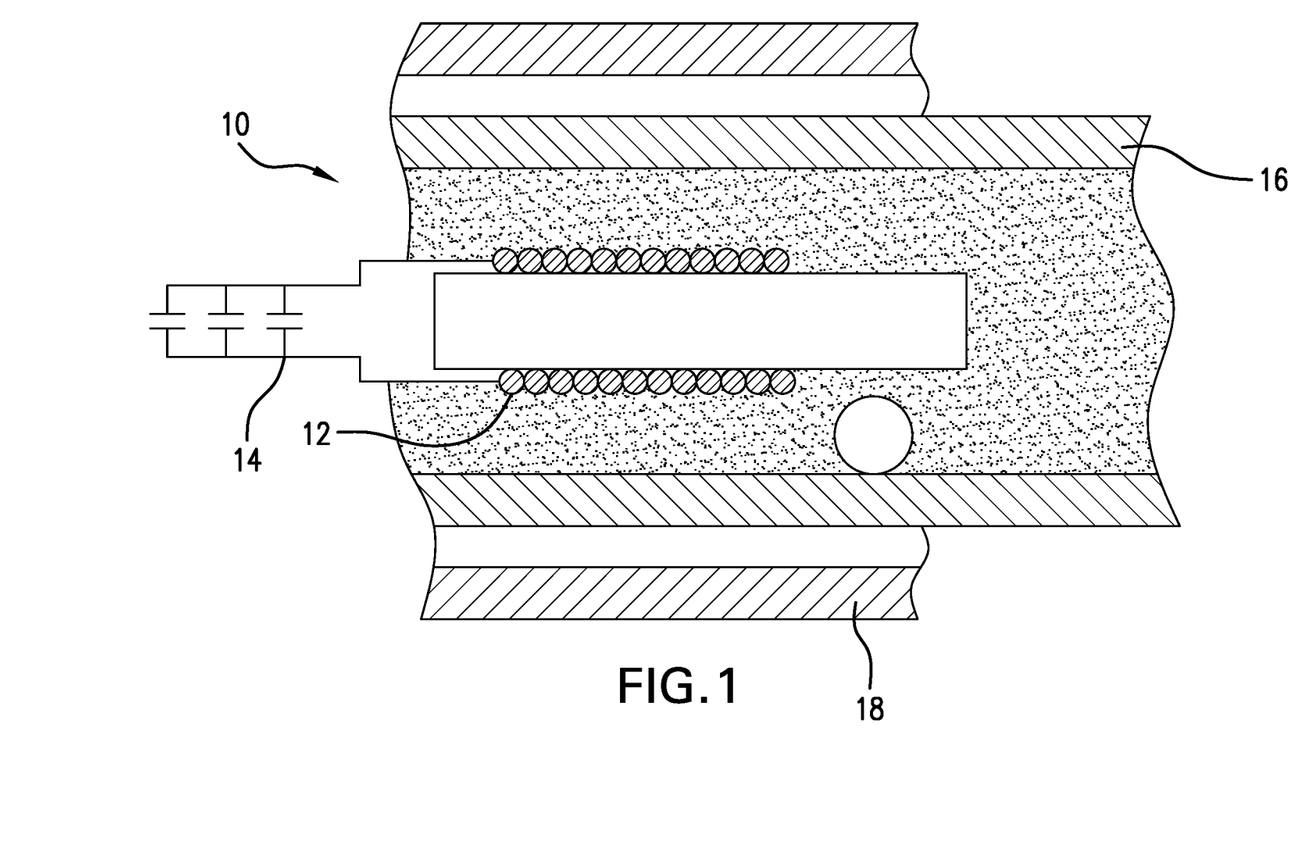
FIG. 1 is a cross sectional view of a magnetic pulse actuation arrangement illustrating such as liner hanger or casing patch installation.

Referring to FIG. 1, one embodiment of a magnetic pulse actuation arrangement 10 is illustrated. The arrangement includes an inductor 12 fed by a capacitor 14. The capacitor 14 may be a source of electrical energy or may be used to condition electrical energy from another source such as a battery (not shown) or cable from a more remote location (not shown). A workpiece 16 is disposed near the inductor 12 such that a magnetic field produced by the inductor is coupled to the workpiece 16 generating a magnetic pulse to move the workpiece. The magnitude of the magnetic pulse is proportionally related to the current applied to the inductor. The velocity of movement of the workpiece under the influence of the magnetic pulse is, as noted above, at a minimum velocity of 200 meters per second.

Movement of the workpiece is adjustable from merely a positional change without impacting another structure to an impact with another structure 18 such as a casing in FIG. 1 at such velocity that plastic deformation of the workpiece 16 occurs at an energy level where a weld is formed between the workpiece 16 and the structure 18. Careful control of the duration of the magnetic pulse allows control of whether the movement will produce a no contact with another structure, where the workpiece may simply be in contact with the other structure such that movement of the workpiece relative to the structure 18 is impeded but fluid passage is not prevented, where a pressure seal without a weld is created (a type of V0 seal) or where a fully welded interface is created by an impact sufficient to cause a material jet and a solid state weld.

Movement may be in a directly radial direction whether inwardly or outwardly or movement may be directed axially or in any other direction selected and in which direction the pulse may be directed. As shown in the depiction of FIG. 1, movement is radially outwardly directed. Movement directed radially is suitable for installing a number of downhole tools that utilize radial displacement such as liner hangers or casing patches (suitably illustrated in generic FIG. 1) where the workpiece is the liner hanger or the casing patch for example, screens, fishing tools, couplings, plugs, etc. Representative illustrations for some of these follow.

Figure 2:
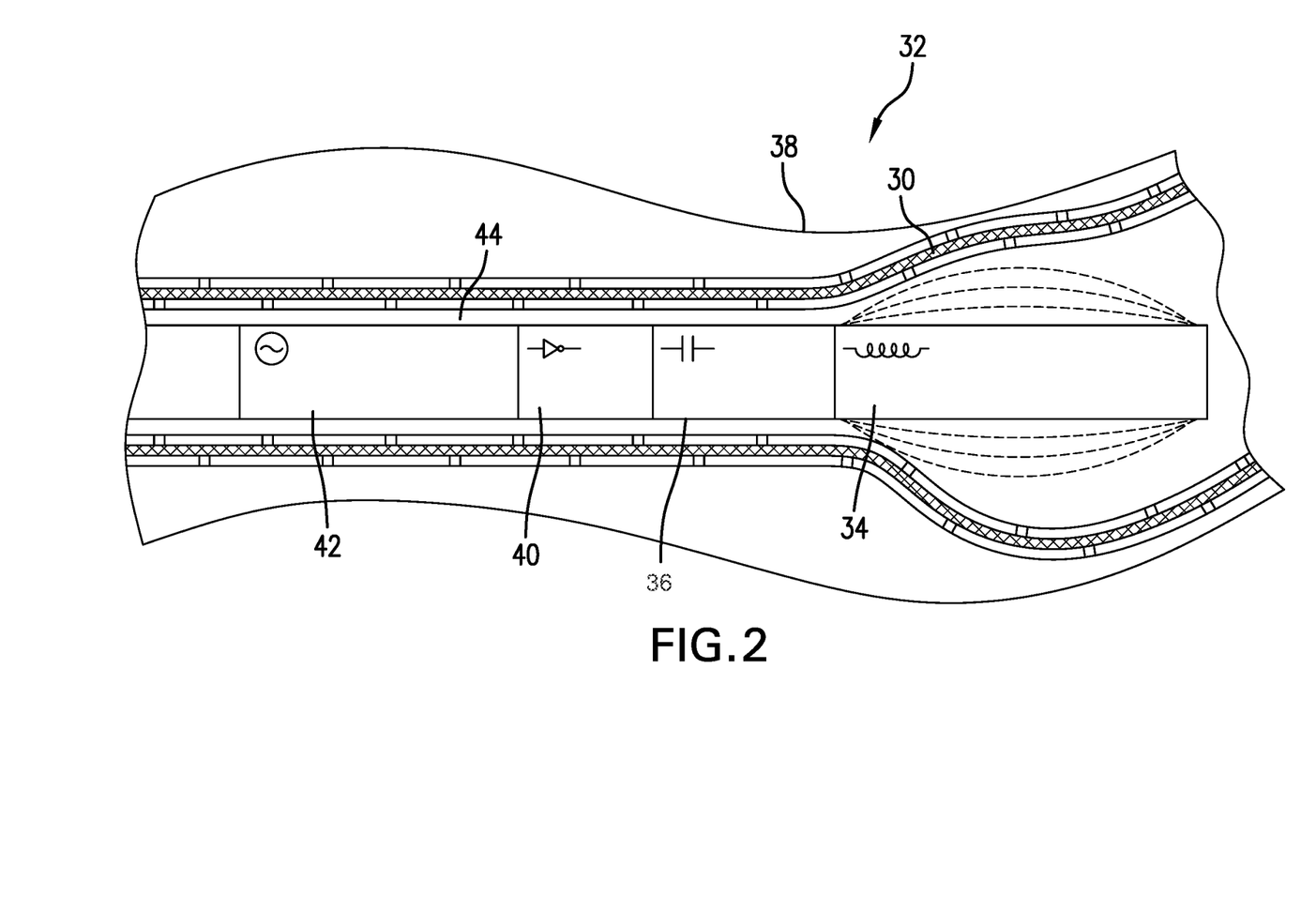
FIG. 2 is another cross sectional view of a magnetic pulse actuation arrangement illustrating a screen installation.

Referring to FIG. 2, a view of a portion of a borehole with a screen 30 disposed about an actuator 32 similar to the layout of FIG. 1 including the source and the inductor is schematically shown. Screen 30 (either with or without inner and or outer shrouds) is accelerated radially outwardly by magnetic pulse occasioned by inductor 34, powered by capacitor 36. The screen 30 may be moved into contact with the borehole wall 38 to function as is known for a screen. The actuator of FIG. 2, may also include an inverter 40 and source 42 as shown. The actuator 32 may be positioned and moved about in the borehole on a workstring 44. In use, the workstring will be positioned, the actuator initiated and then the workstring moved to a next segment of screen 30 to be moved.

Figure 3:
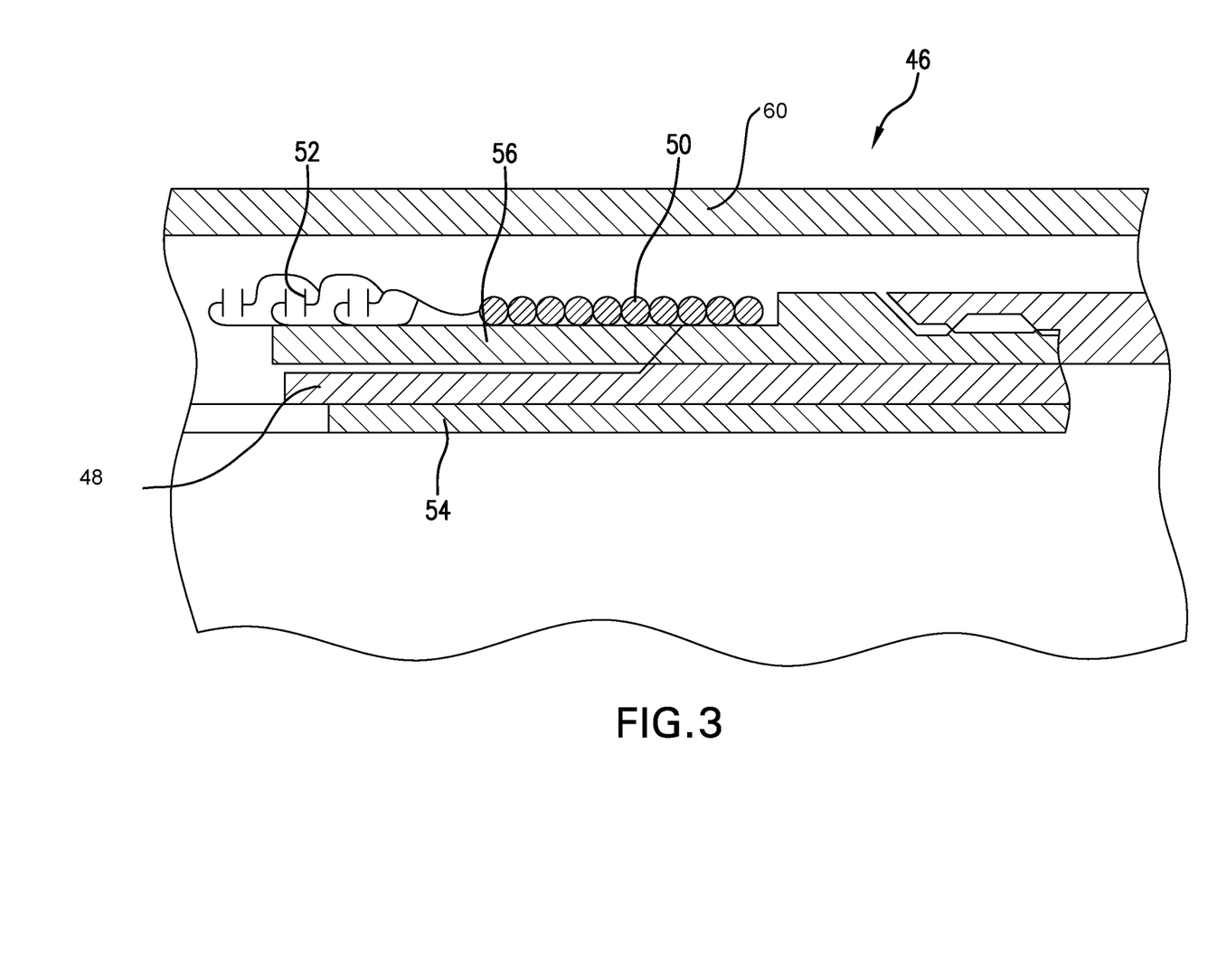
FIG. 3 is another cross sectional view of a magnetic pulse actuation arrangement illustrating a fishing arrangement.

Referring to FIG. 3, the actuator concept disclosed herein is illustrated in connection with a fishing operation. Specifically, actuator 46 is configured at an end of a fishing tool 48 to be run proximately to a fish 54 to be retrieved. Recognizable from the above discussion is inductor 50 and capacitor 52. The actuator 46 is initiated, resulting in a workpiece 56 being moved into forcible contact with the fish 54 (and in some embodiments welded thereto). The fish may then be retrieved. As will be understood by one of ordinary skill in the art, some fishing operations place the fishing tool on the ID (inside diameter) of the fish rather than on the OD (outside diameter) of the fish as illustrated in FIG. 3. If the casing 60 were illustrated on the opposite side of the components (i.e. where the centerline is presently illustrated) in FIG. 3, the illustration would be that of an ID fishing tool. In other respects the operation is identical.

Figure 4:
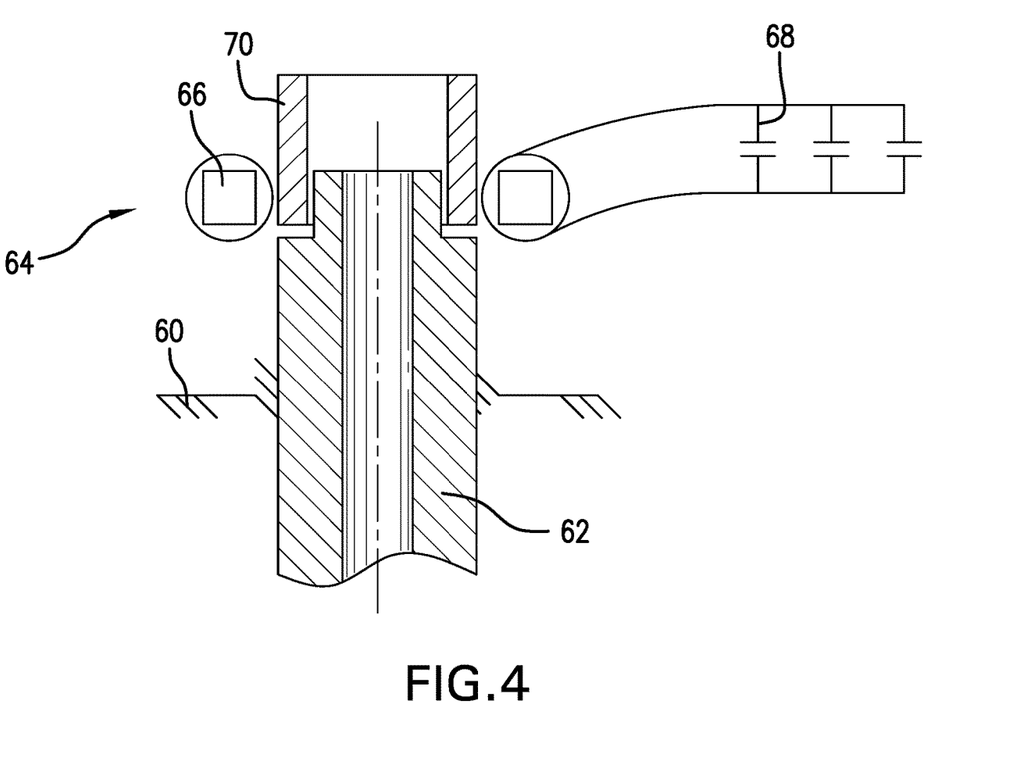
FIG. 4 is another cross sectional view of a magnetic pulse actuation arrangement illustrating a joint coupling arrangement.

Referring to FIG. 4, a schematic cross section view of a coupling operation is illustrated. A rig floor 60 is shown about a tubular 62 being advanced into the hole. A magnetic pulse actuator 64 includes an inductor 66 powered by a capacitor 68 similar to FIG. 1 that is positioned about a workpiece 70, which in this iteration is a coupling to connect sequential tubulars together to create a string. The magnetic pulse accelerates the coupling 70 into contact with the tubular 62 at sufficient velocity to create a connection, whether that be merely an interference fit or a weld as desired by the operator.

Figure 5:
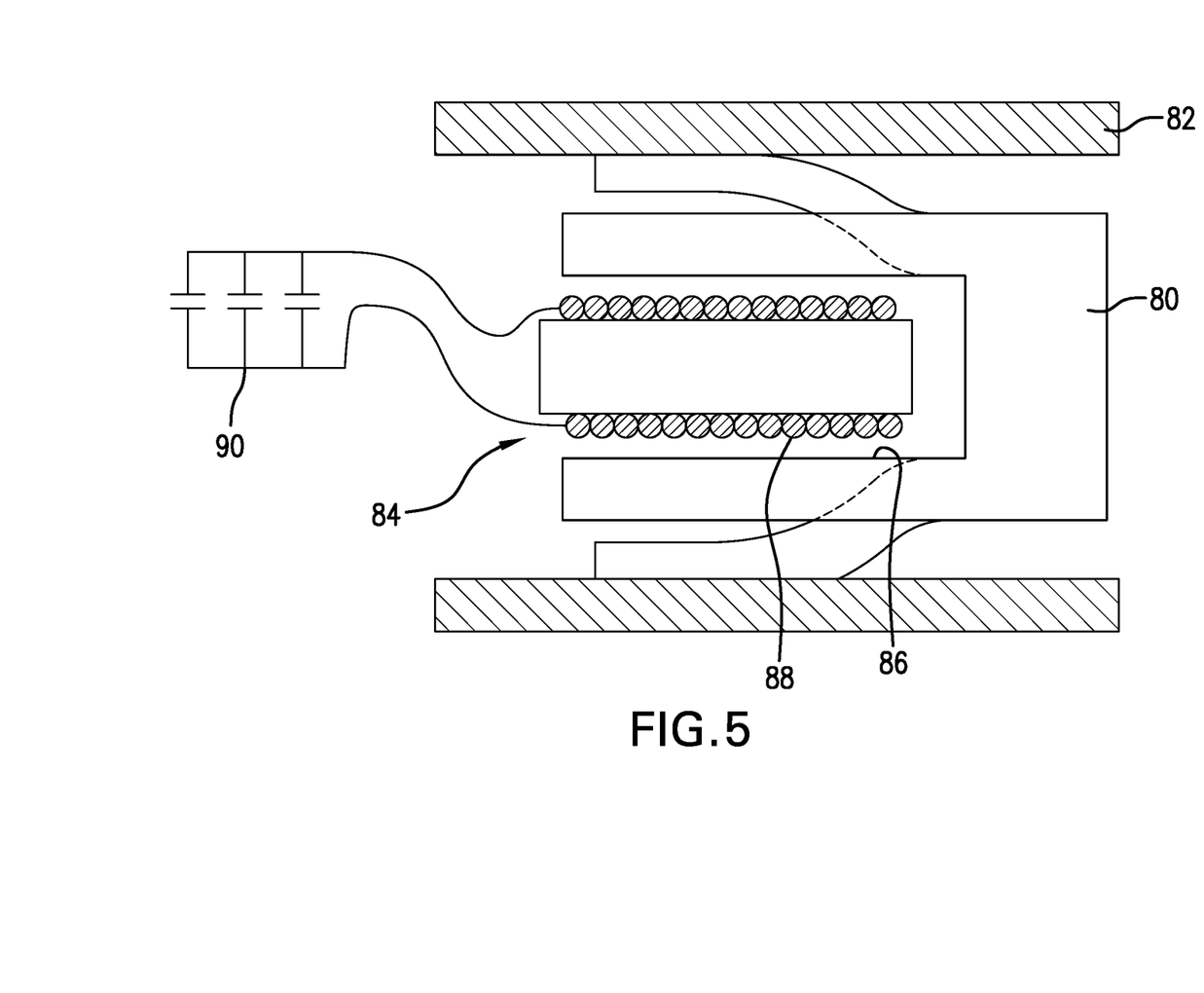
FIG. 5 is another cross sectional view of a magnetic pulse actuation arrangement illustrating a plug installation.

In another embodiment, referring to FIG. 5, a plug 80 is installed in a borehole or casing 82. As illustrated, a plug 80 is positioned at a desired location in the casing 82 either with an actuator 84 in place or in a prior run. The plug 80 is configured with a central recess 86 within which an inductor 88 is placed. The inductor is powered by a capacitor 90. Upon creation of the magnetic pulse as described above, the plug 80 is deformed into contact with the casing 82, illustrated in phantom lines in FIG. 5. The degree to which the plug 80 is urged into contact with the casing 82 is similar to the foregoing embodiments in that the duration of the magnetic pulse may be selected to cause the plug 80 to merely make contact with the casing 82, become frictionally engaged, become frictionally locked, or become welded to the casing, the last iteration providing the most secure plugging of the borehole.

Figure 6:
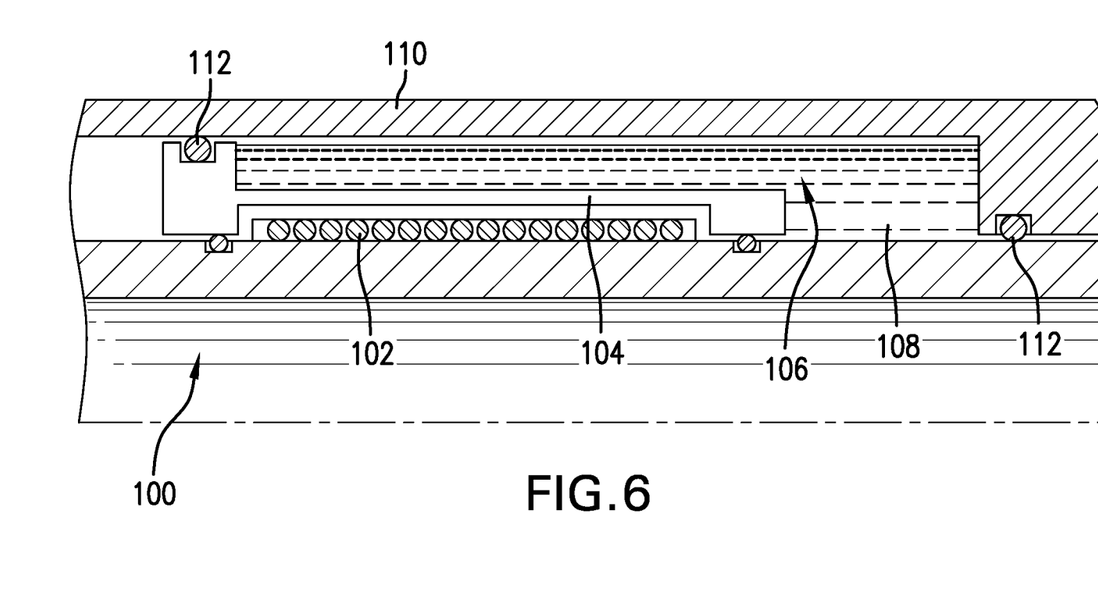
FIG. 6 is an embodiment of magnetic pulse actuation arrangement illustrating axial movement.

Referring to FIG. 6, another embodiment that creates axial movement is illustrated. In this embodiment the magnetic pulse is created in a radial direction like in many of the foregoing embodiments but uses that radial movement to modify a chamber volume to actuate hydraulically in a desired direction. The actuator 100 includes an inductor 102 similar to the foregoing. The inductor is positioned adjacent a workpiece 104 that may be a tubular or just a portion of a chamber 106. Deformation of the workpiece 104 due to magnetic pulse causes the chamber to change volume causing fluid 108 therein to be compressed. In an embodiment the fluid therein is substantially incompressible and hence the energy associated with the deformation must be reacted somewhere. In the illustration, the somewhere is movement of the outer sleeve 110. Due to seals 112 (which may be o-rings), the fluid 108 cannot escape chamber 106. Accordingly chamber 106 must growth in some direction proportionally to the size reduction of chamber 106 due to the workpiece 104 movement. In the illustrated case, the movement is an elongation that is provided by outer sleeve 110 moving to the right in the figure. That movement is axial and useful for actuating whatever tool is desired to be actuated by an axial movement such as a packer, a sleeve, etc.

Set forth below are some embodiments of the foregoing disclosure:

Embodiment 1

A method for installing a tool in a downhole system including running the tool to a target location within a tubular structure, creating a magnetic pulse, and urging the tool toward the tubular structure at a minimum velocity of 200 meters per second with the magnetic pulse.

Embodiment 2

The method as in any prior embodiment wherein the creating includes discharge of a capacitor.

Embodiment 3

The method as in any prior embodiment wherein the creating includes discharge of a battery.

Embodiment 4

The method as in any prior embodiment wherein the urging is into contact with the tubular structure.

Embodiment 5

The method as in any prior embodiment wherein the urging is at a duration sufficient to cause plastic deformation of the tool.

Embodiment 6

The method as in any prior embodiment wherein the plastic deformation forms a bond between the tool and the tubular structure.

Embodiment 7

The method as in any prior embodiment wherein the bond is a weld.

Embodiment 8

The method as in any prior embodiment wherein the contact forms a pressure seal.

Embodiment 9

The method as in any prior embodiment wherein the seal is a V0 seal.

Embodiment 10

The method as in any prior embodiment wherein the tool is a liner hanger or a casing patch.

Embodiment 11

The method as in any prior embodiment wherein the tool is a screen.

Embodiment 12

The method as in any prior embodiment wherein the tool is a coupling.

Embodiment 13

The method as in any prior embodiment wherein the tool is a fishing arrangement.

Embodiment 14

A method for actuating a downhole tool including creating a magnetic pulse, coupling the magnetic pulse to a workpiece, and moving the workpiece with the pulse, the workpiece achieving a minimum velocity of 200 meters per second.

Embodiment 15

The method as in any prior embodiment wherein the moving is radially.

Embodiment 16

The method as in any prior embodiment wherein the moving is axially.

Embodiment 17

The method as in any prior embodiment wherein the coupling includes shaping the magnetic pulse.

Embodiment 18

The method as in any prior embodiment wherein the shaping includes turning the magnetic pulse.

Embodiment 19

The method as in any prior embodiment wherein the moving is at a velocity sufficient to cause plastic deformation of the workpiece when colliding with another structure.

Embodiment 20

The method as in any prior embodiment wherein the plastic deformation is sealing.

Embodiment 21

The method as in any prior embodiment wherein the plastic deformation is welding.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

What is claimed is:

1. A method for installing a tool in a downhole system comprising:
    running the tool to a target location within a tubular structure;
    creating a magnetic pulse;
    causing a chamber of the tool or adjacent the tool to deform from a first volume to a smaller volume;
    pressurizing a fluid within the chamber with the deformation;
    using the pressurized fluid to move another component of the tool or the downhole system in a direction other than a direction of the magnetic pulse.

2. The method as claimed in claim 1 wherein the creating includes discharge of a capacitor.

3. The method as claimed in claim 1 wherein the creating includes discharge of a battery.

4. The method as claimed in claim 1 wherein the direction of the magnetic pulse is radial and the direction of movement of the another component is axial.

5. The method as claimed in claim 4 wherein the chamber is defined at least in part by a tubular.

6. The method as claimed in claim 1 wherein the another component is a packer.

7. The method as claimed in claim 1 wherein the another component is a sleeve.

8. A method for actuating a downhole tool comprising:
    creating a magnetic pulse;
    coupling the magnetic pulse to a workpiece;
    moving the workpiece with the pulse, the workpiece causing deformation of a chamber;

moving another component in a direction other than a direction of the magnetic pulse.

9. The method as claimed in claim 8 wherein the magnetic pulse direction is radially.

10. The method as claimed in claim 8 wherein the moving the another component direction is axially.

11. The method as claimed in claim 8 wherein the coupling includes shaping the magnetic pulse.

12. The method as claimed in claim 8 wherein the moving the another component actuates a tool.

* * * * *